United States Patent
Gaugler et al.

(10) Patent No.: US 11,114,701 B2
(45) Date of Patent: Sep. 7, 2021

(54) METHOD OF PRODUCING AN ELECTRODE-SEPARATOR WINDING, ELECTRODE-SEPARATOR WINDING AND BUTTON CELL WITH SUCH A WINDING

(71) Applicant: VARTA Microbattery GmbH, Ellwangen Jagst (DE)

(72) Inventors: Winfried Gaugler, Ellwangen (DE); Wolfgang Maas, Rosenberg (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 128 days.

(21) Appl. No.: 16/519,773

(22) Filed: Jul. 23, 2019

(65) Prior Publication Data
US 2020/0044288 A1    Feb. 6, 2020

(30) Foreign Application Priority Data
Jul. 31, 2018 (EP) ..................................... 18186515

(51) Int. Cl.
*H01M 10/0587* (2010.01)
*H01M 10/04* (2006.01)
*H01M 10/0525* (2010.01)

(52) U.S. Cl.
CPC ... *H01M 10/0587* (2013.01); *H01M 10/0427* (2013.01); *H01M 10/0431* (2013.01); *H01M 10/0525* (2013.01)

(58) Field of Classification Search
None
See application file for complete search history.

(56) References Cited

U.S. PATENT DOCUMENTS

| 5,834,133 | A | * | 11/1998 | Narukawa | ........... H01M 50/538 |
| | | | | | 429/171 |
| 9,153,835 | B2 | | 10/2015 | Pytlik et al. | |
| 9,496,581 | B2 | | 11/2016 | Pytlik et al. | |
| 9,799,858 | B2 | | 10/2017 | Gaugler | |
| 9,799,913 | B2 | | 10/2017 | Pytlik et al. | |
| 2002/0004171 | A1 | | 1/2002 | Kimijima et al. | |
| 2006/0051662 | A1 | | 3/2006 | Kwak et al. | |

(Continued)

FOREIGN PATENT DOCUMENTS

| JP | 2001155779 A | * | 6/2001 | ............ H01M 10/04 |
| JP | 2008-47303 A | | 2/2008 | |

(Continued)

*Primary Examiner* — Magali P Slawski
*Assistant Examiner* — Jessie L. Walls
(74) *Attorney, Agent, or Firm* — DLA Piper LLP (US)

(57) ABSTRACT

A method of producing an electrode-separator winding includes feeding a first current collector, feeding a second current collector, feeding two separators in strip form to a winding device, and winding the first and second current collectors and the separators to form a winding with a sequence, wherein a contact strip is welded on at least one of the contact sections of the current collectors, or at least one of the contact sections is folded over to form a contact strip, and at least one of the separators is reinforced in at least one risk region in which the at least one separator within the completed electrode-separator winding lies against the at least one contact section in which the contact strip is welded on or against the at least one contact section folded over to form a contact strip.

9 Claims, 3 Drawing Sheets

(56) References Cited

U.S. PATENT DOCUMENTS

| | | | |
|---|---|---|---|
| 2009/0181294 A1* | 7/2009 | Yoppolo | H01M 6/08 |
| | | | 429/142 |
| 2012/0015224 A1 | 1/2012 | Pylik et al. | |
| 2012/0100406 A1 | 4/2012 | Gaugler | |
| 2014/0322577 A1* | 10/2014 | Kakeya | H01M 50/463 |
| | | | 429/94 |
| 2015/0073339 A1 | 3/2015 | Pytlik et al. | |
| 2017/0025703 A1 | 1/2017 | Pytlik et al. | |
| 2017/0149092 A1* | 5/2017 | Zhu | H01M 10/0431 |
| 2017/0187008 A1 | 6/2017 | Gaugler | |
| 2017/0365874 A1 | 12/2017 | Pytlik et al. | |
| 2018/0013101 A1 | 1/2018 | Gaugler | |

FOREIGN PATENT DOCUMENTS

| | | | | |
|---|---|---|---|---|
| KR | 20060097987 A | * | 9/2006 | H01M 10/40 |
| WO | 2010/089152 A1 | | 8/2010 | |
| WO | 2010/146154 A2 | | 12/2010 | |

* cited by examiner

METHOD OF PRODUCING AN ELECTRODE-SEPARATOR WINDING, ELECTRODE-SEPARATOR WINDING AND BUTTON CELL WITH SUCH A WINDING

TECHNICAL FIELD

This disclosure relates to a method of producing an electrode-separator winding with the sequence first current collector/separator/second current collector/separator or second current collector/separator/first current collector/separator, to an electrode-separator winding produced by the method and a button cell with this winding.

BACKGROUND

Button cells usually have a cylindrical housing, the height of which is equal to or smaller than its diameter. Very different electrochemical systems may be contained in the housing. Very popular are cells on the basis of zinc/air, zinc/$MnO_2$ and nickel/zinc. Secondary (rechargeable) systems are also very popular. Examples are nickel/metal-hydride cells, nickel/cadmium cells and lithium-ion cells.

Classically, the housing of button cells generally consists of two solid, usually metal housing parts, between which an electrically insulating seal is arranged. One of the housing parts is in electrical connection with the positive electrode and is correspondingly of positive polarity. The other is in electrical connection with the negative electrode and is correspondingly of negative polarity. The seal is intended to prevent electrical contact between the oppositely poled housing parts. In addition, it is intended to counter any escape or ingress of liquid or moisture from or into the housing.

Lithium-ion cells can achieve very high energy densities. Cells on a lithium-ion basis sometimes include a composite body in the form of a cell stack that consists of multiple individual cells. Usually, however, the cells include a wound composite body (wound composite for short), which is generally a single cell of a wound form.

Button cells with wound composites on a lithium-ion basis are described, for example, in WO 2010/146154 A2 and WO 2010/089152 A1. Wound composites are usually produced by spirally winding up electrodes in strip form (electrode strips for short) and at least one separator in strip form (separator strip for short). The electrode strips and the at least one separator in strip form lie flat on top of one another in the wound composite. They are possibly connected to one another, for example, by lamination or adhesive bonding.

Generally, a wound composite comprises the sequence positive electrode/separator/negative electrode. Wound composites are often produced as so-called bi-cells with the possible sequences negative electrode/separator/positive electrode/separator/negative electrode or positive electrode/separator/negative electrode/separator/positive electrode.

The electrodes in wound composites usually each comprise a metallic current collector and electrochemically active components (often also referred to as active materials) and electrochemically inactive components.

The current collectors serve the purpose of electrically contacting the electrochemically active components over as large an area as possible. They usually consist of sheet-like metal substrates in strip form, for example, metal foils or a metal foam or a metallized nonwoven.

All materials that can take up lithium ions and release them again come into consideration as active materials for secondary lithium-ion systems. The negative electrode of secondary lithium-ion systems are in particular carbon-based materials such as graphitic carbon or non-graphitic carbon materials made capable of intercalation of lithium. Lithium-metal hydroxide compounds and lithium-metal-phosphate compounds such as $LiCoO_2$ and $LiFePO_4$ come into consideration, for example, for the positive electrode of secondary lithium-ion systems.

Electrode binders and conductive agents should be mentioned primarily as electrochemically inactive components. The electrode binders ensure the mechanical stability of the electrodes and provide contacting of the particles of electrochemically active material to one another and also to the current collector. Conductive agents such as carbon black serve the purpose of increasing the electrical conductivity of the electrodes.

Strips of porous plastic films, for example, of a polyolefin or a polyether ketone, come into consideration in particular as separators for the composites mentioned. Nonwoven and woven fabrics of these materials can also be used.

To produce positive and negative electrodes for wound composites, usually pastes comprising the respective active materials and an electrode binder and possibly a conductive agent are applied in the form of thin layers to the current collectors in strip form, dried and brought into the desired shape. After drying, the layers are usually rolled and pressed. In intermittent application, the current collectors are only coated in sections. This results in current collectors in strip form that are divided in the longitudinal direction into mass sections covered with electrode material and, arranged between them, sections not covered with electrode material. To form individual electrode strips, the current collectors only coated in sections are divided up in the region of the sections not covered with electrode material, for example by means of a cutting or punching tool.

It is possible in principle, in a first step, to combine positive and negative electrode strips thus formed with one another and with one or more separator strips to form a single cell in strip form, for example, in that the electrodes are laminated on opposite sides of a separator strip and, subsequently, in a second step, to process the single cell in strip form by winding to form a wound composite.

However, it is often more advantageous to feed the current collectors only coated in sections together with one or more separator strips to a winding device and in the device produce the wound composite directly from the individual strips in one step. For this purpose, the strips are usually wound onto a winding mandrel or a winding core, it having to be ensured that within the winding mass sections covered with electrode material overlap. The winding operation may be discontinued if a section not covered with electrode material is reached. This is then cut through, whereby the wound composite formed is cut off from following, not yet wound sections of the intermittently coated current collector. This results in a wound composite with wound electrode strips, each of which has at least one contact section not covered with electrode material.

Contact sections establish electrical contact between the electrodes and the housing parts mentioned. Positive electrode strips are to be electrically connected to one of the two housing parts of a button cell mentioned at the beginning, negative electrode strips are to be connected to the other of the two housing parts. The housing parts of a button cell each generally have a circular base. In most instances, it is preferred to use such circular bases to make the electrical contact of these contact sections.

It is known from WO 2010/146154 A2 to weld a contact strip aligned axially at an angle of 90° to the winding direction onto a mass-free contact section of an electrode of a wound composite and, by bending it over, lay it flat on an end face of the wound composite. Corresponding procedures are described in FIGS. 2A to 2C and also 3A and 3B of WO 2010/146154 A2. The conductor may then be welded to a base of a housing part, for instance as shown in FIGS. 1A and 1B of WO 2010/146154 A2. The welding operation is performed here after the closing of the cell, that is to say from outside the button cell housing.

Alternatively, contact sections at the ends may also be simply folded over and welded directly to one of the housing parts. The folded-over part of the contact section then itself forms the contact strip.

Problems can be caused by separator strips being in direct contact with the contact strips within the wound composite. Since the contact strips often have sharp edges and the separator strips are often only a few microns thick, and can therefore be easily damaged, in an extreme case this can lead to short-circuits. The regions of the separator strips that come into direct contact with the contact strips are exposed to an increased risk in this respect and are therefore also referred to in the following as risk regions. To counter this risk, it has been proposed, as shown in FIGS. 2B and 2C of WO 2010/146154 A2, to adhesively attach the contact strips with Kapton tapes. This solves the problem described, but at the same time creates a new problem. This is so because it has been observed that the adhesive of the Kapton tape can have an adverse influence on cell performance, presumably caused by water penetration or undesired secondary reactions.

SUMMARY

We provide a method of producing an electrode-separator winding including feeding a first current collector in strip form, which is divided in the longitudinal direction into mass sections covered with a positive electrode material and, arranged between the mass sections, contact sections not covered with the electrode material, to a winding device, feeding a second current collector in strip form, which is divided in the longitudinal direction into mass sections covered with a negative electrode material and, arranged between the mass sections, contact sections not covered with the electrode material, to the winding device, feeding two separators in strip form to the winding device, and winding up the first current collector in strip form, the second current collector in strip form and the separators in the winding device to form a winding with the sequence first current collector/separator/second current collector/separator or second current collector/separator/first current collector/separator, wherein a contact strip is welded on in at least one of the contact sections for the electrical contacting of the current collectors, or at least one of the contact sections is folded over to form a contact strip for the electrical contacting of the current collectors, and at least one of the separators is reinforced in at least one risk region in which the at least one separator within the completed electrode-separator winding lies against the at least one contact section in which the contact strip is welded on or against the at least one contact section folded over to form a contact strip.

We also provide an electrode-separator winding, including a first current collector in strip form, which is divided in the longitudinal direction into at least one mass section covered with a positive electrode material and at least one contact section not covered with the electrode material, a second current collector in strip form, which is divided in the longitudinal direction into at least one mass section covered with a negative electrode material and at least one contact section not covered with the electrode material, two separators in strip form wherein the first current collector in strip form, the second current collector in strip form and the separators are wound up to form a winding with the sequence first current collector/separator/second current collector/separator or second current collector/separator/first current collector/separator, a contact strip is welded on in at least one of the contact sections for the electrical contacting of the current collectors, or at least one of the contact sections is folded over to form a contact strip for the electrical contacting of the current collectors, and at least one of the separators is reinforced in at least one risk region in which the at least one separator within the electrode-separator winding lies against the at least one contact section in which the contact strip is welded on or against the at least one contact section folded over to form a contact strip.

We further provide a button cell including the electrode-separator winding including a first current collector in strip form, which is divided in the longitudinal direction into at least one mass section covered with a positive electrode material and at least one contact section not covered with the electrode material, a second current collector in strip form, which is divided in the longitudinal direction into at least one mass section covered with a negative electrode material and at least one contact section not covered with the electrode material, two separators in strip form wherein the first current collector in strip form, the second current collector in strip form and the separators are wound up to form a winding with the sequence first current collector/separator/second current collector/separator or second current collector/separator/first current collector/separator, a contact strip is welded on in at least one of the contact sections for the electrical contacting of the current collectors, or at least one of the contact sections is folded over to form a contact strip for the electrical contacting of the current collectors, and at least one of the separators is reinforced in at least one risk region in which the at least one separator within the electrode-separator winding lies against the at least one contact section in which the contact strip is welded on or against the at least one contact section folded over to form a contact strip.

BRIEF DESCRIPTION OF THE DRAWINGS

FIG. 2 schematically illustrates a second example of the method, in which two separators are each reinforced in a risk region by folding over the separators at the ends. In the risk regions, after completion of the electrode-separator winding, the separators are respectively in contact with contact sections of current collectors in which contact strips are welded on.

FIG. 3 schematically illustrates a third example of the method, in which two separators are each reinforced in a risk region by a Z folding of the separators. In the risk regions, after completion of the electrode-separator winding, the separators are respectively in contact with contact sections of current collectors in which contact strips are welded on.

DETAILED DESCRIPTION

Figure 1:
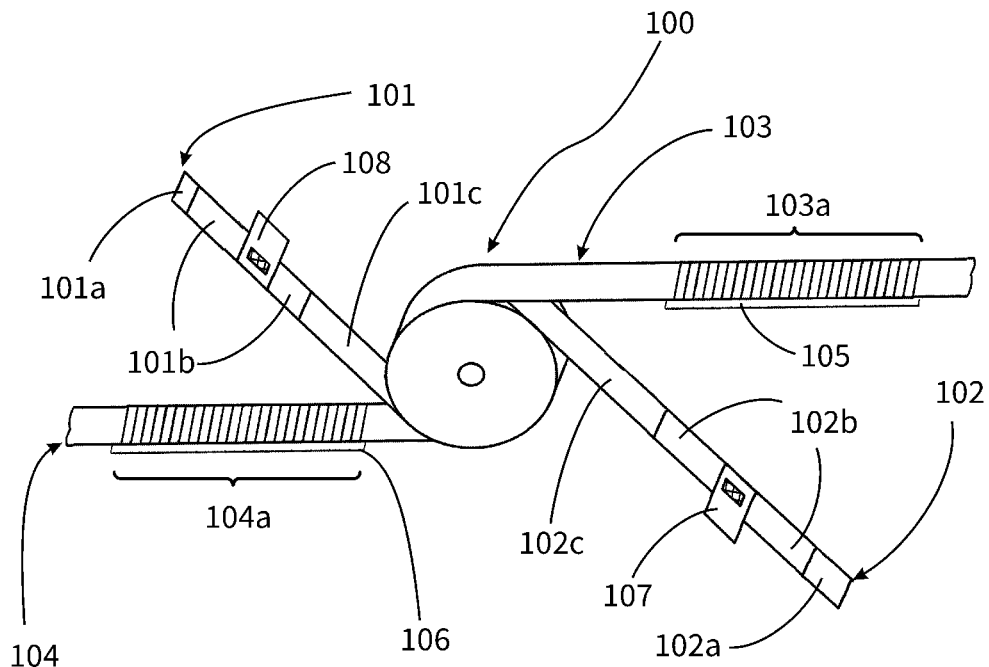
FIG. 1 schematically illustrates a first example of the method, in which two separators are each reinforced in a risk region by fixing on the separators films that can be welded to the separators. In the risk regions, after completion of the electrode-separator winding, the separators are respectively in contact with contact sections of current collectors in which contact strips are welded on. The fixing is ensured by welding the films to the separator.

Our method comprises the following steps:

feeding a first current collector in strip form, which is divided in the longitudinal direction into mass sections covered with a positive electrode material and, arranged between the mass sections, contact sections not covered with the electrode material, to a winding device, feeding a second current collector in strip form, which is divided in the longitudinal direction into mass sections covered with a negative electrode material and, arranged between the mass sections, contact sections not covered with the electrode material, to the winding device, feeding two separators in strip form to the winding device, and winding up the first current collector in strip form, the second current collector in strip form and the separators in the winding device to form a winding with the sequence first current collector/separator/second current collector/separator or second current collector/separator/first current collector/separator.

To this extent, the method does not differ from known methods as far as the method steps described are concerned or as far as the materials and items used are concerned. Thus, for example, the materials, current collectors and separators mentioned at the beginning come into consideration as electrode materials, current collectors and separators.

Likewise as known, we provided that a contact strip is welded on in at least one of the contact sections for the electrical contacting of the current collectors, or at least one of the contact sections is folded over to form a contact strip for the electrical contacting of the current collectors. For this, it is possible, for example, to revert to the procedure known from WO 2010/146154 A2.

On the other hand, our method is distinguished from the known method in that:

at least one of the separators is reinforced in at least one risk region in which the at least one separator within the completed electrode-separator winding lies against the at least one contact section in which the contact strip is welded on or against the at least one contact section folded over to form a contact strip.

The term "risk region" has already been explained. Here, it is a region of the separator exposed to an increased risk of damage because of direct contact with a contact strip as a consequence of which a short-circuit could occur.

A reinforcement of the separator in the risk region means that the separator has a greater thickness in the risk region. As a result, the described risk of a short-circuit can be countered just as well as with Kapton tapes. However, the disadvantages these entail do not necessarily occur, which is further explained below.

Particularly preferably, that the method is distinguished by at least one of the following:

the first current collector and second current collector are cut through in the region of two contact sections, each forming a contact section at the end, and the separators are cut through, to each form a separator section at the end;

the electrode-separator winding is completed by winding up the contact sections at the ends and the separator sections at the ends.

Particularly preferably, the method is distinguished by one of the following:

to form the contact strip for the electrical contacting of the current collectors, at least one of the contact sections at the ends is folded over;

the at least one contact section in which the contact strip is welded on is a contact section at the end or else a contact section not at the end, arranged between two mass sections.

In examples in which a contact strip is welded on in at least one of the contact sections for the electrical contacting of the current collectors, it is usually preferred that the contact strip is welded on at an angle of 45° to 135° to the main direction of extent of the current collector in strip form.

In examples in which at least one of the contact sections at the ends is folded over to form a contact strip for the electrical contacting of the current collectors, it is usually preferred that the at least one contact section at the end is folded over by a folding along a folding line aligned at an angle of 10° to 80° to the main direction of extent of the current collector in strip form. It then preferably comprises a folded-over subsection in strip form and a non-folded-over subsection.

Thus, the main direction of the extent of the current collector in strip form means the direction in which the current collector has its greatest extent in the state in which it is laid out flat.

Preferably, both separators in strip form are reinforced in the risk regions, not only one of the separators.

It is preferred that, to reinforce the separators, in the at least one risk region a film that can be welded to the separators is fixed in one or more layers on the separator. The fixing is preferably performed by welding the film to the separator.

Particularly preferably, a film of the same material as the separator is used as the film.

Further preferably, the reinforcements are formed by a folding of the separators, in particular by a Z folding.

The electrode-separator winding always comprises a first current collector in strip form, which is divided in the longitudinal direction into at least one mass section covered with a positive electrode material and at least one contact section not covered with the electrode material, a second current collector in strip form, which is divided in the longitudinal direction into at least one mass section covered with a negative electrode material and at least one contact section not covered with the electrode material, and two separators in strip form wherein the first current collector in strip form, the second current collector in strip form and the separators are wound up to form a winding with the sequence first current collector/separator/second current collector/separator or second current collector/separator/first current collector/separator, and a contact strip is welded on in at least one of the contact sections for the electrical contacting of the current collectors, or at least one of the contact sections is folded over to form a contact strip for the electrical contacting of the current collectors.

The electrode-separator winding can be produced by the method described above. It is correspondingly distinguished in particular in that:

at least one of the separators is reinforced in at least one risk region in which the at least one separator within the electrode-separator winding lies against the at least one contact section in which the contact strip is welded on or against the at least one contact section folded over to form a contact strip.

Preferred examples of the electrode-separator winding are evident from the above description of the method, both as far as the materials and items used are concerned and as far as the various examples of the reinforcement are concerned.

Any button cell comprising the described electrode-separator winding, in particular the electrode-separator winding that can be produced by the method, is the subject of this disclosure.

Figure 4:
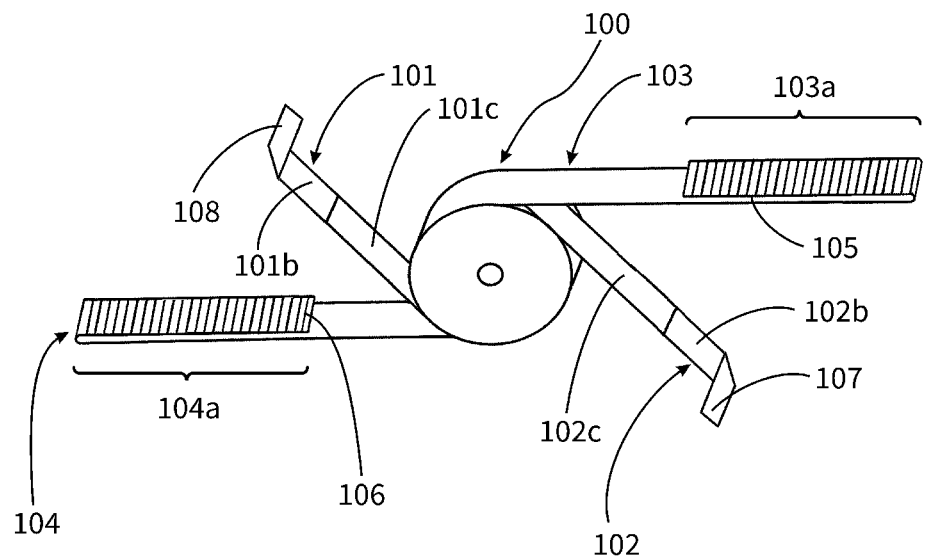
FIG. 4 schematically illustrates a fourth example of the method, in which two separators are each reinforced in a risk region by folding over the separators at the ends. In the risk regions, after completion of the electrode-separator winding, the separators are respectively in contact with contact sections of current collectors in which the current collectors are folded over by a folding along two folding lines each aligned at an angle of 45° to the main direction of extent of the current collectors in strip form to form contact strips for the electrical contacting of the current collectors.

The button cell may, for example, have a housing as in FIG. 4 of WO 2010/089152 A1 or as in FIG. 1 of WO 2010/146154 A2. The housings each have circular bases. The electrode-separator winding described is arranged in the housings such that its end faces face in the direction of the circular bases, possibly even lie flat against them.

The welding of the housing parts to the contact strips may, for example, be performed as shown in FIGS. 1A and 1B of WO 2010/146154 A2.

Sealing the button cell is preferably performed by a customary injection-moulded or foil seal.

Further features, details and advantages emerge from the appended claims and the abstract, the wording of both of which is made the content of the description by reference, the following description of preferred examples and also on the basis of the drawings.

According to the method shown in FIG. 1, a first current collector in strip form 101, which is divided in the longitudinal direction into mass sections covered with a positive electrode material (sections 101a and 101c) and, arranged between the mass sections, contact sections not covered with the electrode material (section 101b), a second current collector in strip form 102, which is divided in the longitudinal direction into mass sections covered with a negative electrode material (sections 102a and 102c) and, arranged between the mass sections, contact sections not covered with the electrode material (section 102b), and two separators in strip form 103 and 104 are processed to form an electrode-separator winding 100.

The two separators 103 and 104 are reinforced in the risk regions 103a and 104a (shown hatched) by the films 105 and 106. The films 105 and 106 are fixed on the separators 103 and 104 by welding. In the risk regions 103a and 104a, after completion of the electrode-separator winding, the separators 103 and 104 lie against the contact sections 101b and 102b of the current collectors 101 and 102. In these contact sections 101b and 102b, the contact strips 107 and 108 are welded on. As a consequence of the reinforcement, the risk of a short-circuit in the risk regions 103a and 104a can be minimized.

Figure 2:
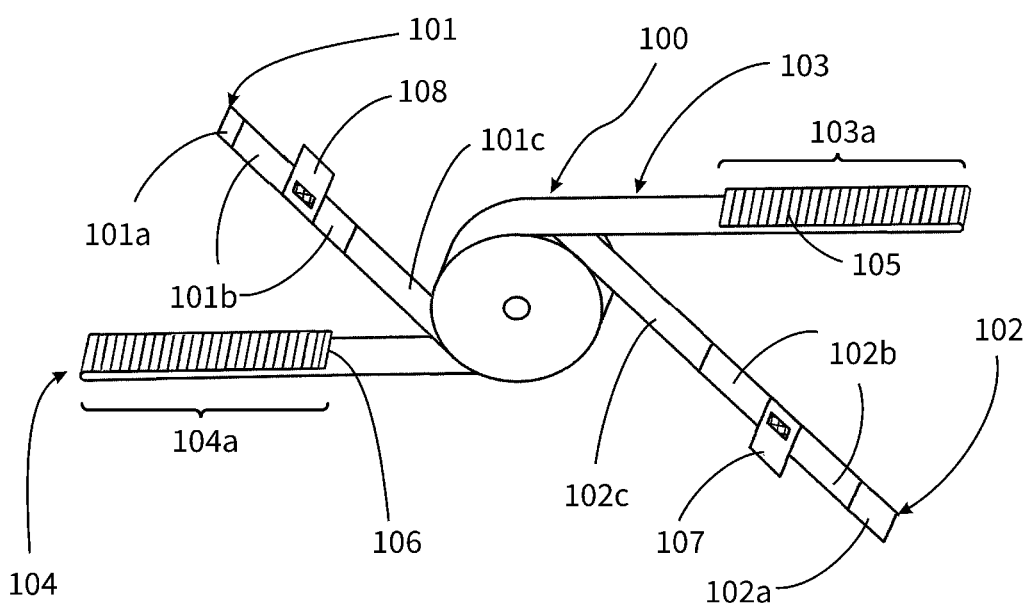

According to the method shown in FIG. 2, a first current collector in strip form 101, which is divided in the longitudinal direction into mass sections covered with a positive electrode material (sections 101a and 101c) and, arranged between the mass sections, contact sections not covered with the electrode material (section 101b), a second current collector in strip form 102, which is divided in the longitudinal direction into mass sections covered with a negative electrode material (see sections 102a and 102c) and, arranged between the mass sections, contact sections not covered with the electrode material (section 102b), and two separators in strip form 103 and 104 are processed to form an electrode-separator winding 100.

The two separators 103 and 104 are reinforced in the risk regions 103a and 104a (shown hatched) by the films 105 and 106. The films 105 and 106 are sections of the separators 103 and 104 that have been simply folded over at their ends. In the risk regions 103a and 104a, after completion of the electrode-separator winding, the separators 103 and 104 lie against the contact sections 101b and 102b of the current collectors 101 and 102. In these contact sections 101b and 102b, the contact strips 107 and 108 are welded on. As a consequence of the reinforcement, the risk of a short-circuit in the risk regions 103a and 104a can be minimized.

Figure 3:
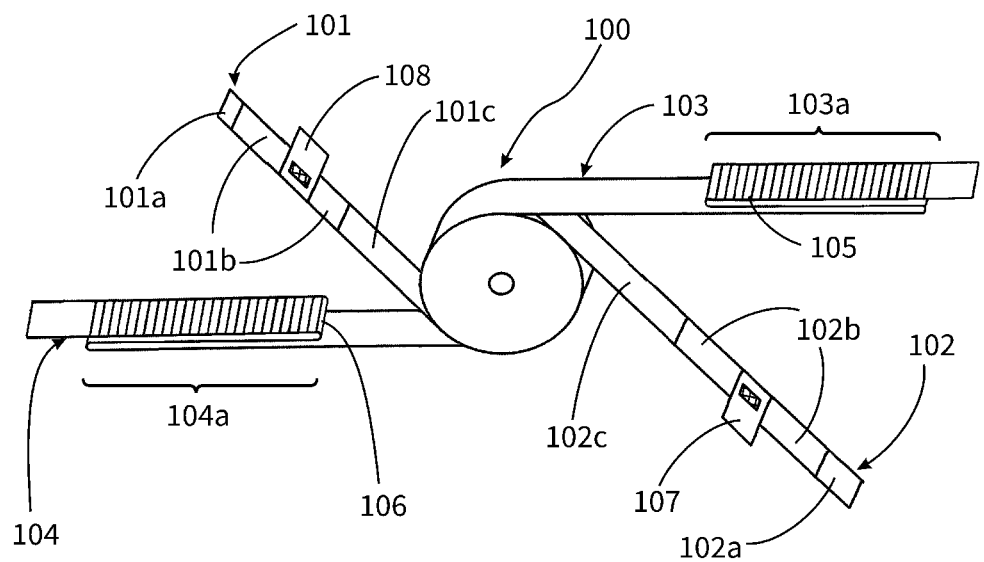

According to the method shown in FIG. 3, a first current collector in strip form 101, which is divided in the longitudinal direction into mass sections covered with a positive electrode material (sections 101a and 101c) and, arranged between the mass sections, contact sections not covered with the electrode material (section 101b), a second current collector in strip form 102, which is divided in the longitudinal direction into mass sections covered with a negative electrode material (sections 102a and 102c) and, arranged between the mass sections, contact sections not covered with the electrode material (section 102b), and two separators in strip form 103 and 104 are processed to form an electrode-separator winding 100.

The two separators 103 and 104 are reinforced in the risk regions 103a and 104a (shown hatched) by the films 105 and 106. The films 105 and 106 are sections of the separators 103 and 104 that have been folded over in the form of a Z. In the risk regions 103a and 104a, after completion of the electrode-separator winding, the separators 103 and 104 lie against the contact sections 101b and 102b of the current collectors 101 and 102. In these contact sections 101b and 102b, the contact strips 107 and 108 are welded on. As a consequence of the reinforcement, the risk of a short-circuit in the risk regions 103a and 104a can be minimized.

According to the method shown in FIG. 4, a first current collector in strip form 101, which is divided in the longitudinal direction into mass sections covered with a positive electrode material (sections 101a and 101c) and, arranged between the mass sections, contact sections not covered with the electrode material (section 101b), a second current collector in strip form 102, which is divided in the longitudinal direction into mass sections covered with a negative electrode material (sections 102a and 102c) and, arranged between the mass sections, contact sections not covered with the electrode material (section 102b), and two separators in strip form 103 and 104 are processed to form an electrode-separator winding 100.

The two separators 103 and 104 are reinforced in the risk regions 103a and 104a (shown hatched) by the films 105 and 106. The films 105 and 106 are sections of the separators 103 and 104 that have been simply folded over at their ends. In the risk regions 103a and 104a, after completion of the electrode-separator winding, the separators 103 and 104 lie against the contact sections 101b and 102b of the current collectors 101 and 102. In these contact sections 101b and 102b, the current collectors 101 and 102 are respectively folded over by a folding along two folding lines 109 and 110 aligned at an angle of about 45° to the main direction of extent of the current collectors in strip form 101 and 102 to form contact strips 107 and 108 for the electrical contacting of the current collectors 101 and 102. As a consequence of the reinforcement, the risk of a short-circuit in the risk regions 103a and 104a can be minimized.

Figure 5:
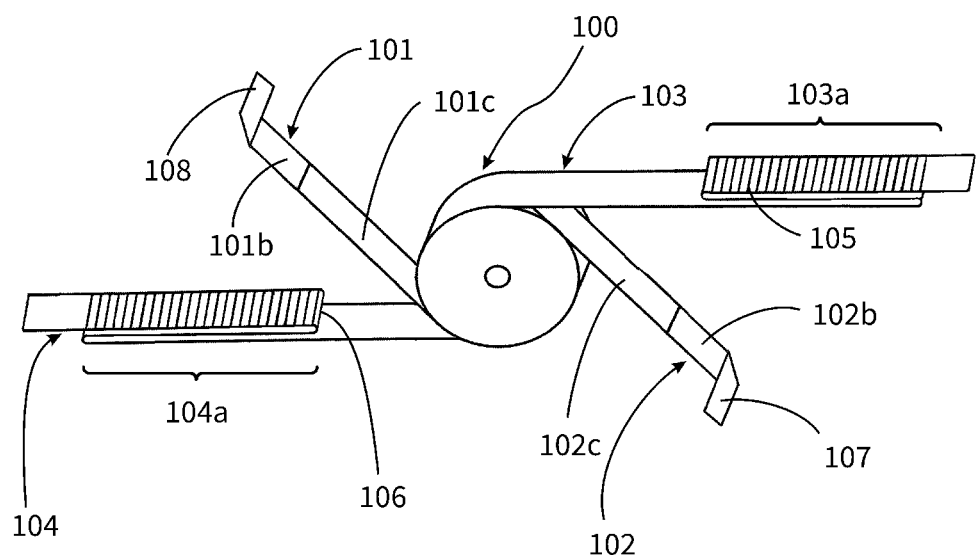
FIG. 5 schematically illustrates a fifth example of the method, in which two separators are each reinforced in a risk region by a Z folding of the separators. In the risk regions, after completion of the electrode-separator winding, the separators are respectively in contact with contact sections of current collectors in which the current collectors are folded over by a folding along two folding lines each aligned at an angle of 45° to the main direction of extent of the current collectors in strip form to form contact strips for the electrical contacting of the current collectors.

According to the method shown in FIG. 5, a first current collector in strip form 101, which is divided in the longitudinal direction into mass sections covered with a positive electrode material (sections 101a and 101c) and, arranged between the mass sections, contact sections not covered with the electrode material (section 101b), a second current collector in strip form 102, which is divided in the longitudinal direction into mass sections covered with a negative electrode material (sections 102a and 102c) and, arranged between the mass sections, contact sections not covered with the electrode material (section 102b), and two separators in strip form 103 and 104 are processed to form an electrode-separator winding 100.

The two separators 103 and 104 are reinforced in the risk regions 103a and 104a (shown hatched) by the films 105 and 106. The films 105 and 106 are sections of the separators 103 and 104 that have been folded over in the form of a Z. In the risk regions 103a and 104a, after completion of the electrode-separator winding, the separators 103 and 104 lie against the contact sections 101b and 102b of the current collectors 101 and 102. In these contact sections 101b and 102b, the current collectors 101 and 102 are respectively folded over by a folding along two folding lines 109 and 110 aligned at an angle of about 45° to the main direction of extent of the current collectors in strip form 101 and 102 to form contact strips 107 and 108 for the electrical contacting of the current collectors 101 and 102. As a consequence of the reinforcement, the risk of a short-circuit in the risk regions 103a and 104a can be minimized

What is claimed is:

1. A method of producing an electrode-separator winding comprising:
    feeding a first current collector in strip form, which is divided in the longitudinal direction into mass sections covered with a positive electrode material and, arranged between the mass sections, contact sections not covered with the electrode material, to a winding device,
    feeding a second current collector in strip form, which is divided in the longitudinal direction into mass sections covered with a negative electrode material and, arranged between the mass sections, contact sections not covered with the electrode material, to the winding device,
    feeding two separators in strip form to the winding device, and
    winding up the first current collector in strip form, the second current collector in strip form and the separators in the winding device to form a winding with the sequence first current collector/separator/second current collector/separator or second current collector/separator/first current collector/separator,
    wherein
    a contact strip is welded on in at least one of the contact sections for the electrical contacting of the current collectors, or at least one of the contact sections is folded over to form a contact strip for the electrical contacting of the current collectors, and
    at least one of the separators is reinforced in a Z-shaped folding and at least one risk region in which the at least one separator within the completed electrode-separator winding lies against the at least one contact section in which the contact strip is welded on or against the at least one contact section folded over to form a contact strip.

2. The method according to claim 1, further comprising:
    the first current collector and second current collector are cut through in the region of two contact sections, each forming a contact section at the end, and the separators are cut through, each forming a separator section at the end; and
    the electrode-separator winding is completed by winding up the contact sections at the ends and the separator sections at the ends.

3. The method according to claim 2, with the additional step that to form the contact strip for the electrical contacting of the current collectors, at least one of the contact sections at the ends is folded over.

4. The method according to claim 1, further comprising:
    to reinforce the separators, in the at least one risk region a film that can be welded to the separators is fixed in one or more layers on the separator.

5. The method according to claim 4, with the additional step that the fixing is performed by welding.

6. The method according to claim 4, wherein a film of the same material as the separator is used as the film.

7. The method according to claim 1, wherein the at least one reinforcement is formed by Z folding.

8. An electrode-separator winding, comprising:
    a first current collector in strip form, which is divided in the longitudinal direction into at least one mass section covered with a positive electrode material and at least one contact section not covered with the electrode material,
    a second current collector in strip form, which is divided in the longitudinal direction into at least one mass section covered with a negative electrode material and at least one contact section not covered with the electrode material,
    two separators in strip form
    wherein
    the first current collector in strip form, the second current collector in strip form and the separators are wound up to form a winding with the sequence first current collector/separator/second current collector/separator or second current collector/separator/first current collector/separator,
    a contact strip is welded on in at least one of the contact sections for the electrical contacting of the current collectors, or at least one of the contact sections is folded over to form a contact strip for the electrical contacting of the current collectors, and
    at least one of the separators is reinforced in a Z-shaped folding and at least one risk region in which the at least one separator within the electrode-separator winding lies against the at least one contact section in which the contact strip is welded on or against the at least one contact section folded over to form a contact strip.

9. A button cell comprising the electrode-separator winding according to claim 8.

* * * * *